United States Patent [19]

Franz et al.

[11] 4,429,924
[45] Feb. 7, 1984

[54] PRESSURE-LUBRICATED AUTOMOTIVE-TYPE ALTERNATOR

[75] Inventors: Herbert Franz, Stuttgart; Manfred Frister, Schwieberdingen, both of Fed. Rep. of Germany

[73] Assignee: Robert Bosch GmbH, Stuttgart, Fed. Rep. of Germany

[21] Appl. No.: 403,099

[22] Filed: Jul. 29, 1982

[30] Foreign Application Priority Data

Sep. 10, 1981 [DE] Fed. Rep. of Germany ....... 3135901

[51] Int. Cl.³ .............................................. F01M 1/06
[52] U.S. Cl. ................................ 308/187; 123/196 R; 123/198 DA; 310/87; 310/90
[58] Field of Search ............... 308/187; 310/54, 68 D, 310/68 R, 87, 90, 168, 263; 123/196 R, 196 W, 198 R, 198 DA; 384/380, 389–391, 398; 464/7, 179, 183; 384/322, 380, 397

[56] References Cited

U.S. PATENT DOCUMENTS

| | | | |
|---|---|---|---|
| 2,309,985 | 2/1943 | Ruist | 308/187 |
| 2,556,435 | 6/1951 | Moehrl et al. | 310/54 |
| 3,261,295 | 7/1966 | White | 310/90 |
| 3,546,505 | 12/1970 | Morris | 310/90 |
| 3,558,942 | 1/1971 | Hill | 310/54 |
| 3,602,747 | 8/1971 | Stroppa | 310/68 D |
| 3,797,609 | 3/1974 | Bertaud | 184/7 R |
| 4,113,327 | 9/1978 | Koch | 308/187.1 |
| 4,167,171 | 9/1979 | Issler et al. | 123/196 R |

*Primary Examiner*—R. M. Skudy
*Assistant Examiner*—D. L. Rebsch
*Attorney, Agent, or Firm*—Frishauf, Holtz, Goodman & Woodward

[57] ABSTRACT

To provide for effective lubrication of a vehicular-type alternator, the bearings (2, 4) positioned at the respective end plates (1, 5) are pressure-lubricated. An oil pressure supply duct (21) is directed towards the rear bearing (4) which is positioned within a chamber (23), the chamber communicating with the central longitudinal bore (24) extending through the shaft towards the drive bearing (2). The drive bearing is positioned within a second chamber (26, 29) and radial bores (25) extend from the central bore (24) in the shaft into the drive side chamber, the drive side chamber being connected to a drain duct 30. To provide communication between the end faces of the bearings, a sickle-shaped recess extends partially circumferentially around the outer race of the respective bearing in the zone of termination of the ducts (21, 30), and having an axial length longer than the respective outer race (34) of the bearing.

8 Claims, 2 Drawing Figures

PRESSURE-LUBRICATED AUTOMOTIVE-TYPE ALTERNATOR

The present invention relates to a pressure-lubricated automotive-type alternator, and more particularly to an alternator suitable for association with an internal combustion (IC) engine for vehicular use, to provide charging power for a battery and for electrical equipment of the on-board electrical network of a motor vehicle.

BACKGROUND

The lifetime and power output of alternators depends, to some extent, on the efficiency and operation of the bearings journalling the rotor of the alternator. It is preferred to provide oil lubrication for rolling-type bearings, and in some applications it is desirable to provide pressure lubrication for the bearings. Pressurized lubricant can be obtained by connecting the pressure lubrication circuit of the alternator to the oil pressure circuit of a motor vehicle of which the alternator is a part. It is, of course, also possible to provide a separate pressurized oil supply source for the alternator.

THE INVENTION

It is an object to provide a pressurized oil circuit for an alternator which is simple to construct, efficient in operation, and provides for reliable lubrication of two bearings of an alternator.

Briefly, the shaft of the alternator is formed with a longitudinal central bore. An oil pressure supply duct and an oil removal duct are connected through the housing of the alternator, the supply and removal ducts terminating in chambers located adjacent the respective drive side bearing and back side-bearing of the alternator. The longitudinal bore of the shaft terminates in one of the chambers at an axial end thereof, and the other side of the shaft, adjacent the drive side bearing, is formed with at least one radial bore communicating the longitudinal central bore through the shaft with the chamber into which also one of the ducts extends. The bearings, and particularly the drive side bearing, are sealed against the outside to prevent contamination of the bearings by dust, dirt, or other contaminants and to insure long life thereof.

The central longitudinal bore which is formed within the shaft of the rotor of the alternator permits easy pumping action in the direction of flow towards the drive side bearing. Preferably, the drive side bearing is formed as a ball bearing. Thus, the lubricant flow itself provides for transport of contaminant particles, chips and metal particles which may be due to friction or rubbing action in the bearings.

Preferably, the oil is supplied at the side of the housing remote from the drive pulley of the alternator, which will be referred to as the back side of the alternator. The oil is drained, or the outflow is from the duct at the drive side of the alternator.

The seals for the bearings can be customary radial sealing rings, O-rings, or the usual sealing disks, for example made of felted or similar material, as well known in structures of this type.

In accordance with a preferred embodiment, the supply duct of the pressurized lubricant terminates immediately adjacent the rear bearing, so that the lubricant flow is directed to the rear bearing, preferably at the axial central portion thereof. The chamber for oil collection is preferably formed as a recess within the rear bearing shield or end bell of the alternator; for uniform distribution of lubricant, it is preferred to form two chambers, one at either side of each one of the bearings, so that the rolling elements of the bearings will be continuously bathed in oil which flows in the lubricant circuit.

The invention is applicable to various types of alternators, and will be described, by way of example, in connection with a slipringless alternator of the claw-pole type construction.

DRAWINGS

Figure 2:
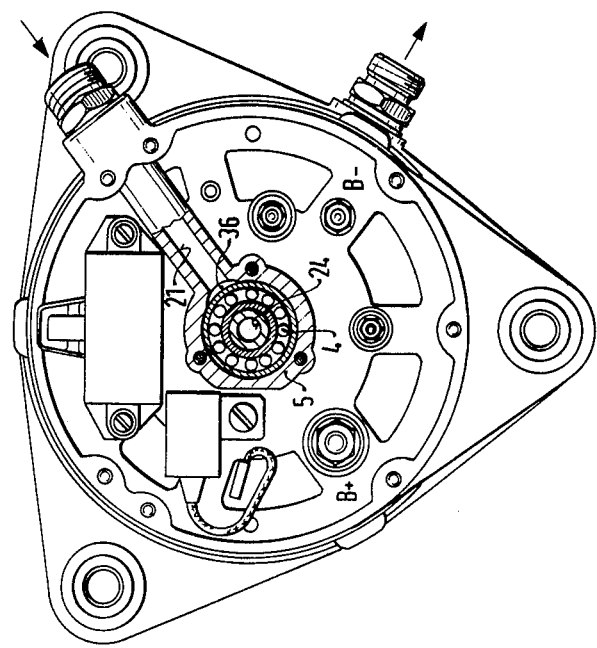
FIG. 2 is an end view, partly in section, along line II—II of FIG. 1.

The alternator illustrated in the drawing is intended to be driven by an internal combustion (IC) engine, not shown, for example a public service or utility vehicle. It has a drive side end plate or end bell 1 with a ball bearing 2. The rear side of the alternator has a rear end plate or end bell 5 in which a roller bearing 4 is secured. The shaft 3 is retained within the bearings 2, 4. Sealing elements are provided to prevent ingress of dust, dirt, and the like, and to retain the shaft 3 free from contamination within the bearings 2, 4. The two end plates or end bells 1, 5 are secured together by screws 7 which hold the end plates against a central portion 8 which forms a ring-shaped intermediate housing element. The housing element 8 has an internally directed fitting surface 9, within which the stator lamination stack is positioned, pressed together with a radial pressure fit. The stator lamination stack carries three armature windings 11, uniformly distributed throughout its circumference, to provide three-phase alternating current output. The armature windings are alternately cut by a magnetic field which is guided by a claw-pole rotor 12, secured to the shaft 3. The magnetic field is generated by a fixed field winding 13 which is secured to a soft-iron sleeve 15 held against the inside of the end bell 1 by screws 14.

Figure 1:
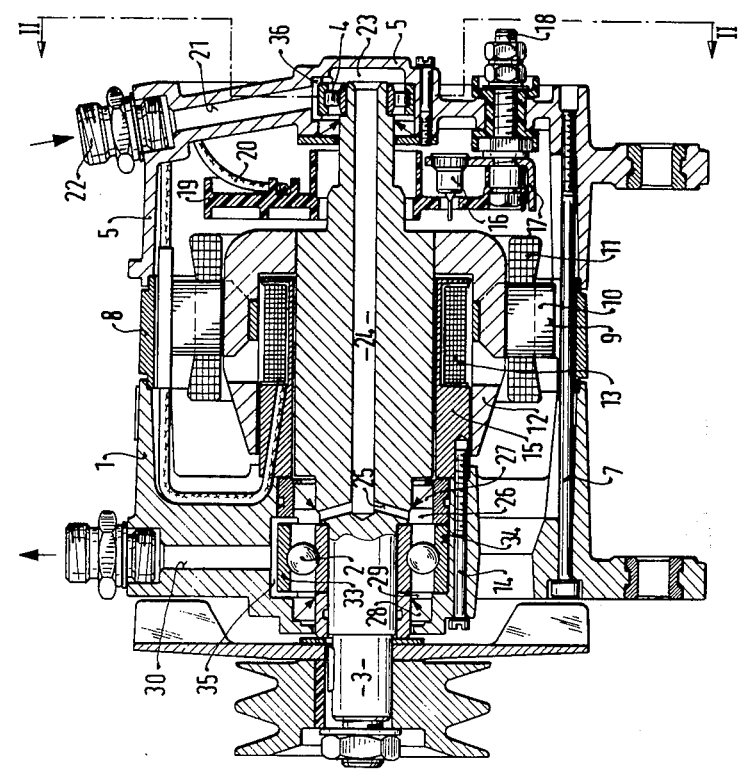
FIG. 1 is an axial sectional view through an alternator.

The voltages induced in the armature windings 11 are conducted to three rectifier pairs for full-wave rectification. Only one of the diodes 16 forming the rectifier is shown in FIG. 1, the diode being secured to a cooling plate 17 which is connected to a connection bolt 18 accessible from the rear end shield 5, and forming the B+ terminal (see FIG. 2). Additionally, three exciter diodes are connected to the armature windings 11, secured to a carrier ring 19 of insulating material. The exciter diodes—not shown separately—supply current to the field windings 13 via a connecting line 20. A voltage regulator can be secured to the alternator directly.

This is the general construction of a slipringless alternator of the vehicular type, as well known and as customary in such apparatus.

In accordance with the present invention, and deviating from the well known construction, pressurized lubrication is provided for bearings 2 and 4.

Pressurized oil is supplied over the rear end plate 5 through a supply duct 21, which is connected to a supply stub 22 for connection to a pressurized oil supply. Duct 21 terminates in a chamber 23 which is recessed at the free outer facing end of the bearing 4 in the central zone of the end plate or shield 5. The chamber 23 communicates with a longitudinal central bore formed in the shaft 3. Bore 24 terminates short of the end of the shaft 23, just in advance of the zone of bearing 2, where one or more radially directed bores 25 form communications of the outer surfaces of the shaft 3 with the bore 24. The radial bores 25, preferably extending at an inclination with respect to a plane transversely to the shaft 3, operate similar to oil flingers to fling oil passing through the central bore 24 radially outwardly into a ring-shaped chamber 26. Chamber 26 is axially sealed with respect to the central portion of shaft 3 by a sealing ring 27. A second sealing ring 28, close to the outside of ball bearing 2, is so constructed that a space 29 is left between the sealing element or ring 28 and the drive side face of the bearing 2 to permit passage of lubricant through the bearing. Upon rotation of shaft 23, the chambers 26, 29 will act like pumps due to centrifugal action within the chambers, so that lubricant is pumped outwardly, for drainage to a radially directed drainage duct 30.

To insure unimpeded flow of lubricant to the drainage duct 30, the space within which the bearing 2 is retained is formed with a sickle-shaped enlargement 35 adjacent the outer race 33 of the bearing 2 in the zone of termination of the duct 30, and extending towards the shaft 3. The recess 35 extends over the two end faces of the bearing 2 in order to form communication between the chamber 26 and chamber 29, that is, in axial direction across the bearing 2, and surrounding a portion of the outer bearing race 34.

In accordance with a preferred embodiment, the rear bearing 4 likewise is seated in a chamber which is open at both end faces of the bearings, and a sickle-shaped recess 36 is formed adjacent the outer race to provide communication between the two chambers at both sides of the bearing.

Various changes and modifications may be made within the scope of the inventive concept.

We claim:

1. Pressure-lubricated vehicular-type alternator comprising
   a stator;
   a rotor;
   a drive side bearing (2) and a rear side bearing (4);
   a shaft rotatable in said bearings and supporting the rotor;
   and a pressure lubricating circuit to lubricate said bearings, comprising
   an oil pressure supply duct (21) and an oil removal duct (30);
   a longitudinal bore (24) formed in the shaft (3);
   at least one axially inclined radially extending communication bore (25) formed in the shaft adjacent said drive side bearing (2) and located to fling oil by centrifugal force out of said longitudinal bore, said shaft terminating in an orifice directing said so-flung oil towards and across an end face of said drive side bearing;
   means (23) for establishing fluid communication between the oil pressure supply and the longitudinal bore (24) in the shaft;
   and means for removing oil from said drive side bearing and establishing oil communication between said drive side bearing and the oil removal duct (30).

2. Alternator according to claim 1, wherein said drive side bearing is a ball bearing, and the orifice of said at least one radially extending communication bore directs oil to the balls of the ball bearing.

3. Alternator according to claim 2, wherein the rear side bearing is a roller bearing;
   the alternator includes a rear side bearing plate (5) securing said roller bearing in position, and an oil collection chamber (23) formed in said rear side bearing plate in fluid communication with the oil pressure supply duct (21), said longitudinal bore (24) and an end face of the bearing, to provide oil flow to said roller bearing.

4. Alternator according to claim 1, further including a drive side bearing plate (1) retaining the drive side bearing (2);
   and a drive side ring-shaped oil collection chamber formed adjacent an axial end face of the drive bearing, in fluid communication with said at least one radially extending communication bore, said chamber having a portion (29) located adjacent the other axial end face of said drive side bearing and an eccentric recess portion (35) spanning part of the outer circumference of said drive side bearing to provide fluid communication through the drive side bearing as well as parallel thereto across a portion thereof,
   the oil removal duct (30) being in fluid communication with said eccentrically positioned portion.

5. Pressure-lubricated vehicular-type generator having
   a first side bearing plate (1) and a first rolling element-type bearing having an inner race, an outer race, and roller elements between said races;
   a second bearing plate (5) and a second rolling element-type bearing (4) having an inner race, an outer race, and rolling elements between said races;
   a shaft (3) rotatable in said bearings;
   and a pressure-lubricating circuit to lubricate said bearings, comprising
   an oil pressure supply duct (21) having a terminal orifice directing oil to the outer race of one of the bearings;
   an oil distribution chamber (23) located axially outwardly of the bearing adjacent the axial end of the shaft and receiving oil directed to one of the bearings;
   a longitudinal bore (24) formed in the shaft (3);
   at least one radially extending communication bore (25) formed in the shaft adjacent the other bearing (2);
   two ring-shaped oil-collecting chambers (26, 29) formed adjacent the axial end faces of the other bearing (2) in fluid communication with the radially extending communication bore (25);
   means (27, 28) axially sealing said chambers adjacent the second bearing with respect to escape of oil axially therefrom;
   an oil communication recess formed in the second bearing plate extending transversely of the outer race of the second bearing and in fluid communication with said oil collection chambers;
   and an oil removal duct in fluid communication with said recess and removing oil from said recess which is circulated axially through the second bearing between the races for continuous lubrication and cooling of the roller elements therebetween.

6. Alternator according to claim 5, wherein the oil communication recess formed in the bearing plate extending transversely of the outer race of said other bearing (2) comprises a sicle-shaped enlargement formed in the respective bearing plate (1).

7. Generator according to claim 5, wherein the axis of said at least one radially extending communication bore is inclined with respect to the axis of the shaft and is directed towards the central zone of said other bearing (2) to spray fluid on the roller elements therein.

8. Generator according to claim 5, wherein the at least one radially extending communication bore (25) is located adjacent the drive side bearing of the alternator, and said two ring-shaped collection chambers (26, 29) are located adjacent the bearing plate (1) which is close to the drive side, to induce pressure-lubricated oil flow from the oil distribution chamber (23) located remote from the drive side towards the drive side of the generator.

* * * * *